US008516912B2

(12) United States Patent
Busch

(10) Patent No.: US 8,516,912 B2

(45) Date of Patent: Aug. 27, 2013

(54) DRIVE FOR THE DOOR LEAF OF A CONVENTIONAL DOOR

(75) Inventor: Sven Busch, Dortmund (DE)

(73) Assignee: Dorma GmbH + Co. KG, Ennepetal (DE)

( * ) Notice: Subject to any disclaimer, the term of this patent is extended or adjusted under 35 U.S.C. 154(b) by 463 days.

(21) Appl. No.: 12/522,864

(22) PCT Filed: Dec. 11, 2007

(86) PCT No.: PCT/EP2007/010776

§ 371 (c)(1), (2), (4) Date: Jul. 10, 2009

(87) PCT Pub. No.: WO2008/083806

PCT Pub. Date: Jul. 17, 2008

(65) Prior Publication Data

US 2010/0089190 A1 Apr. 15, 2010

(30) Foreign Application Priority Data

Jan. 12, 2007 (DE) ......................... 10 2007 002 650

(51) Int. Cl.
*F16H 25/08* (2006.01)
*F16H 25/16* (2006.01)

(52) U.S. Cl.
USPC ............................................................... 74/54

(58) Field of Classification Search
USPC .................. 74/53, 54, 567, 569; 49/139, 404
See application file for complete search history.

(56) References Cited

U.S. PATENT DOCUMENTS 4,069,544 A 1/1978 D'Hooge
2008/0005969 A1 * 1/2008 Bienek ............................ 49/139
2008/0209811 A1 * 9/2008 Bienek ............................ 49/139
2008/0222957 A1 9/2008 Bienek

FOREIGN PATENT DOCUMENTS

EP 0 544 254 6/1993
EP 1505239 A1 * 2/2005
WO WO 2006/066664 6/2006

OTHER PUBLICATIONS

Wilhelm Albers Hamburg.
Dorma Automatik "ED 200-D Mounting and installing manual Montage, Einstellung and Inbetriebnahmeanleitung".

* cited by examiner

*Primary Examiner* — Justin Krause
(74) *Attorney, Agent, or Firm* — Cozen O'Connor

(57) ABSTRACT

A swing leaf operator having a closer portion. The closer portion has an output shaft, on which a cam disc is torsion-resistantly disposed, as well as a pressure roller. A closer spring presses the pressure roller against a running surface of the cam disc. The pressure roller is disposed such that, during an opening or closing of a swing leaf coupled to the output shaft, the pressure roller is moved along a path. The path bypasses the axial center of the output shaft and on account of the configuration of the running surface of the cam disc, in different modes of operation of the swing leaf operator at a respective opening angle of the swing leaf, a very similar or identical torque is respectively applied to the output shaft. The swing leaf operator has a drive motor in operational connection with the output shaft.

25 Claims, 18 Drawing Sheets

Slide channel

Standard arm assembly

DRIVE FOR THE DOOR LEAF OF A CONVENTIONAL DOOR

CROSS REFERENCE TO RELATED APPLICATIONS

This is a U.S. national stage of International Application No. PCT/EP2007/010776, filed on Dec. 11, 2007, claiming priority to German Application No. 10 2007 002 650.3, filed on Jan. 12, 2007, the entire contents of both applications being expressly incorporated herein by reference.

BACKGROUND OF THE INVENTION

1. Field of the Invention

The invention relates to a swing leaf operator based on a cam mechanism.

2. Description of the Related Art

Typically, swing leaf operators with a cam mechanism have a cam disc which is torsion-resistantly disposed on an output shaft and has a running surface, on which a pressure roller rolls which is pressed against said surface by means of a closer spring.

The shape of the running surface determines the characteristics of the torque applied to the operated swing leaf during an opening respectively a closing movement, that is the resulting torque curve.

When seen in a longitudinal extension of the output shaft of the swing leaf operator, the cam disc may present a symmetrical or an asymmetrical form in cross-section.

The pressure roller is supported such that it can move towards and away from the cam disc. The movement takes place in the direction of and away from the axis of rotation of the output shaft.

The torque curve is predetermined by the shape of the respective running surface of the cam disc. This means that the cam disc has to be specifically configured, i.e. manufactured for each individual application.

In a slide-channel operation, cam discs that have a symmetrically configured cross-section result in torque curves that are different from a standard arm assembly or a scissor arm assembly operation, both in magnitude and progression.

However, in order to be able to utilize one and the same swing leaf operator for both modes of operation, the torque curves need to be substantially consistent.

Asymmetrical cam discs have been developed for this purpose, the two running surface halves thereof being configured for respectively one mode of operation. The progression of the respective torque curve defined by the shape of the running surfaces is not variable.

However, if a door provided with a swing leaf operator is to be equipped with a fire protection function, torques are only admissible within certain predetermined limits in a predetermined first range of an opening angle (approximately 0° to 4°) of a swing leaf and in a predetermined second range of an opening angle (approximately 88° to 92°) of the swing leaf. Moreover, over the entire range of the opening angle of the swing leaf, there is a minimum torque which can not fall below a certain value.

The only known possibility for modifying the torque at the swing leaf consists in mechanisms for adapting the initial tension of the closer spring. In most cases, such mechanisms comprise an adjusting screw, by means of which the position of a closer spring abutment can be modified. Thereby, the magnitude of the torque can be modified in a substantially constant proportion. The shape of the torque curve remains unchanged.

In the event a torque is too high at an opening angle of 0°, that is with the swing leaf being closed, and a final torque, that is a torque at a maximum opening angle of 90° to 100° for example, is only slightly higher than a minimum admissible torque, an adjustment of the initial tension of the closer spring could in fact reduce the torque at an opening angle of 0°, but at the same time the final torque would fall below the admissible minimum torque. Thus, a conversion to a fire protection function would be impossible. Replacing a swing leaf operator by a completely new one leads to enormous cost.

SUMMARY OF THE INVENTION

It is the object of the invention to provide a swing leaf operator, which can be manufactured inexpensively adapted to the respective individual application or which can be adapted or rearranged for the respective individual application even in the mounted condition.

An inventive swing leaf operator comprises a closer portion. The closer portion has an output shaft, on which a cam disc is torsion-resistantly disposed. Furthermore, it has a pressure roller. By means of an operational connection, a closer spring presses the pressure roller against a running surface of the cam disc. In relation to an axial center of the output shaft, the pressure roller is disposed such that, during opening and closing of a swing leaf coupled to the output shaft, the pressure roller is moved along a path. Due to the fact that the path bypasses an axial center of the output shaft and on account of the configuration of the running surface of the cam disc, a very similar or identical torque is respectively applied to the swing leaf during a respective opening angle of the swing leaf in different modes of operation of the swing leaf operator. This means in one mode of operation, applied to the swing leaf and depending on the opening angle of the swing leaf, a progression of a torque characteristic is achieved, which is identical or very similar to a torque characteristic in another mode of operation.

In this case, the torque characteristic is a characteristic line of a torque applied to the swing leaf as a function of the opening angle of the swing leaf.

Furthermore, the swing leaf operator comprises a drive motor which is in operational connection with the output shaft.

It is advantageous that not only the proportion of the torque can be modified, but that it is also possible to adapt the shape of the torque curve to the respective individual application, during a movement, that is an opening or closing movement of a swing leaf, despite the utilization of a cam disc with one and the same shape.

Thereby, a single swing leaf operator can be employed in different modes of operation. According to the invention, these modes of operation comprise slide channel operation and standard arm assembly respectively scissor arm assembly operation and preferably in addition parallel arm assembly operation.

On account of the new disposition of the pressure roller, the torque curves have proven to be adjustable to each other, in particular in slide channel operation and in standard arm assembly operation and in particular when utilizing a symmetrically configured cam disc.

On account of the comparably important weight of swing leaf operators, these are traditionally mounted by means of transom mounting or overhead mounting. This means that the respective swing leaf operator is mounted in a door transom, at an upper portion of a door casing or of a frame, to which a swing leaf is hung. Usually, this portion extends horizontally above a swing leaf. However, a door leaf mounting is likewise conceivable, in which the inventive swing leaf operator is mounted to the respective door leaf itself.

The described adaptation of torque curves is in particular achieved with a transom mounting of the inventive swing leaf operator in slide channel operation on a push-side or in standard arm assembly operation on a pull-side. The same effect is achieved in particular in mounting the inventive swing leaf operator on the door leaf in a slide channel operation on the pull-side, or in a standard arm assembly operation on the push-side.

In addition, an adaptation to different European standards is possible. This means one and the same swing leaf operator can be used for different types of opening respectively closing scenarios and with door leaves having different weights, which in turn requires a smaller variety of differently configured swing leaf operators. This fact results in a reduction of manufacturing costs.

In addition, it is possible to modify not only the degree of the torque increase, but, if necessary, it is also possible to modify the increase such that the torque does not decrease in the beginning for example, but increases instead (from a lower torque at an opening angle from 0° on).

Moreover, such an adjustment allows for a transom compensation, such that a mounting is possible both on the pull-side and on the push-side. Furthermore, such configured swing leaf operators can be employed for different geometric door dimensions.

If the output shaft and the housing of the inventive swing leaf operator are configured such that the output shaft, at both ends, can be operationally connected to a swing leaf, the swing leaf operator can be employed furthermore in both DIN right-handed and DIN left-handed swing leaf doors. For this purpose, in the area of the ends of the output shaft, the housing has a respective through opening, which, if applicable, is provided with a covering cap, such as to cover the not utilized end of the output shaft to the outside.

Furthermore, it may be intended that the position of the pressure roller with regard to the cam disc is not defined. This means, during a rotation, the cam disc moves the pressure roller along up to a predetermined position. The reached position corresponds to the position in which the desired torque curve is achieved. Preferably, the adjustment for a symmetrical cam disc is done with regard to the symmetrical axis.

According to the invention, it is additionally intended to pre-rotate the cam disc. It is thereby possible to harmonize the torque at an opening angle of 0° in the above mentioned modes of operation.

In addition, it has proven to be advantageous for a standard arm assembly to vary the distance from the axial center of the output shaft of the swing leaf operator to the point of rotation of a swing leaf and/or the distance from the axial center of the output shaft of the swing leaf operator to the pivot point of the standard arm assembly at the swing leaf or, in the event of mounting to the door leaf, at a door transom or the like. With an increasing distance to the point of rotation of the swing leaf, the maximum opening angle and the leverage effect will change. On account of these variations, it is possible to modify the torques in a predetermined proportion. For example the torque at an opening angle of 0° in proportion to a final torque and the torque curve can be modified based on the adjustment of the maximum opening angle. It has proven to be particularly advantageous, if the distance to the pivot point of the standard arm assembly is equal or larger than the distance to the point of rotation of the swing leaf.

According to the invention, the cam disc is symmetrically configured and preferably has a heart-shaped cross-sectional surface. Compared to an asymmetrical cam disc, this represents a cost advantage. On the one hand, the shape of just one half of the running surface of the cam disc needs to be calculated and thus to be developed. Furthermore, less different running surface shapes are required, which reduces the multiplicity of cam discs to be employed and thus the amount of manufacturing tools.

As an alternative or in addition, the swing leaf operator according to the invention is configured such that the direction of the path of motion of the pressure roller can be adjusted in the mounted condition of the swing leaf operator. It is thereby possible to adapt the swing leaf operator, still in the mounted condition, i.e. on-site, to potential particularities of the opening, respectively closing operations. In addition, it is therefore even possible to provide the swing leaf operator with a new function even afterwards, or to convert it from slide channel operation to standard arm assembly operation or to parallel arm assembly operation or vice-versa. This can be realized in that the pressure roller is displaceably disposed in a transverse direction or at an angle between 0° and less than 90° with regard to the above described path of motion of the pressure roller.

This translates to one and the same swing leaf operator being universally employable. The manufacturing costs are reduced, because a multiplicity of automatic functions, such as a fire protection function for example, can be realized with less species of swing leaf operators.

As an alternative or in addition, it is intended to support the assembly consisting of at least one pressure roller and one closer spring such as to be rotatable and lockable, wherein the point of rotation is not the axial center of the output shaft of the swing leaf operator.

In addition to or instead of the rotational support, the assembly may be supported such as to be displaceable as a whole.

BRIEF DESCRIPTION OF THE DRAWINGS

Further features and advantages of the invention will become apparent from the following description of preferred embodiment examples, in which.

DETAILED DESCRIPTION OF EMBODIMENTS

Figure 1A:
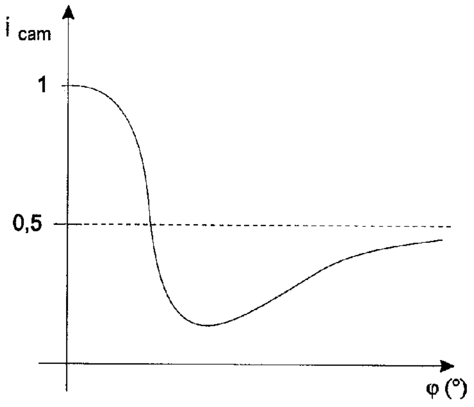
FIG. 1A is a diagram showing the progression of a ratio of power transmission of a cam disc with a traditional cam mechanism as a function of an opening angle.

In FIG. 1A, the progression of a power transmission $i_{cam}$ is diagrammatically illustrated for a symmetrically configured cam disc of a traditional cam mechanism as a function of an opening angle ϕ of a swing leaf. At an opening angle ϕ of 0°, the power transmission $i_{cam}$ is substantially equal to 1. Subsequently, the power transmission $i_{cam}$, within a relatively small opening angle range, drops relatively sharply to a low, minimum value, and subsequently rises again.

Figure 1B:
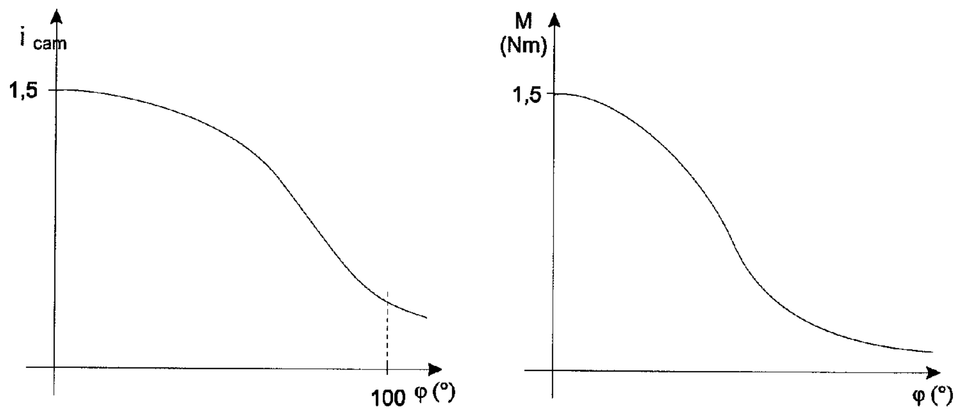
FIG. 1B shows two diagrams, illustrating the progression of the ratio of power transmission, respectively of a torque as a function of the opening angle with a traditional cam mechanism in a slide channel operation.

Combining such a cam mechanism with a slide channel will result in a power transmission curve according to the left diagram in FIG. 1B. At an opening angle ϕ of 0°, the power transmission $i_{cam}$ amounts to approximately 1.5 and subsequently drops similarly to a parabola, which is open to below. At an opening angle ϕ of 0°, initially the negative rise of the curve is relatively small and increases with an increasing opening angle ϕ. The power transmission curve has the strongest drop that means the largest negative increase in an opening angle range of approximately 80° to 90°. Subsequently, this negative increase declines. The torque curve resulting therefrom is shown on the right hand side in FIG. 1B. It has a similar progression as the power transmission curve.

Figure 1C:
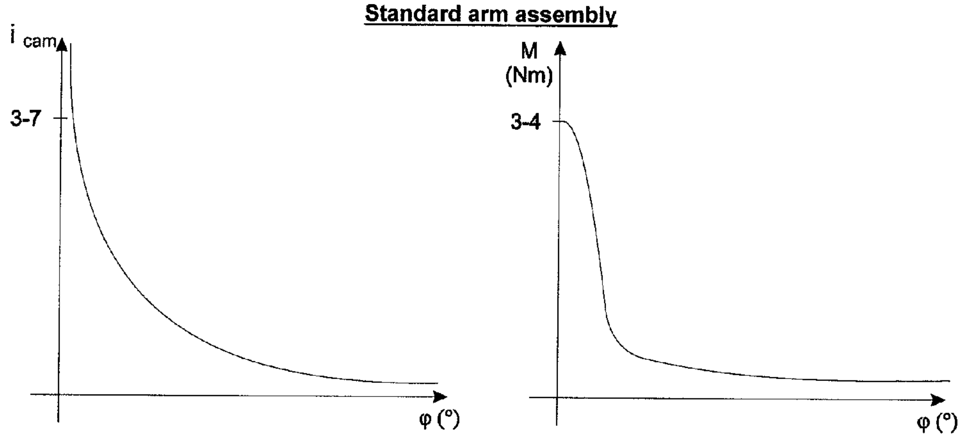
FIG. 1C shows two diagrams, illustrating the progression of the ratio of power transmission, respectively of the torque as a function of the opening angle with a traditional cam mechanism in a standard arm assembly operation.

Combining the same cam mechanism with a standard arm assembly will result in a power transmission curve according to the left diagram in FIG. 1C. In contrast to the power transmission curve shown in FIG. 1B, in this case, the power transmission $i_{cam}$ at an opening angle ϕ of 0° is substantially higher, the power transmission may have a value of between 3 to 7 or may even tend to almost infinite. Subsequently, the power transmission $i_{cam}$ drops similarly to a parabola which is open to the top. The negative rise of the power transmission curve declines steadily. The torque curve resulting therefrom is shown on the right hand side in FIG. 1C. In the beginning, this means at an opening angle ϕ of 0°, the torque M is relatively high and amounts to approximately 3 to 4 Nm. Subsequently, the torque drops considerably within a very small opening angle range and approaches a low minimum value. Therefore, the adjustment of a door resting position (opening angle ϕ in a range of approximately 0°) is extremely difficult. Small modifications of the opening angle ϕ result in a strong modification of the torque M.

In order to be able, with one and the same cam disc, to achieve torque characteristics for slide channel operation and for standard arm assembly operation that are substantially equal or similar and preferably correspond substantially to the torque curve of the slide channel operation, it is intended to dispose the pressure roller off-center. This means that the pressure roller, with regard to the cam disc, is movable along a path, in which a direction of movement of the pressure roller, at any point of the path, does not intersect the axial center of the cam disc.

Figure 1D:
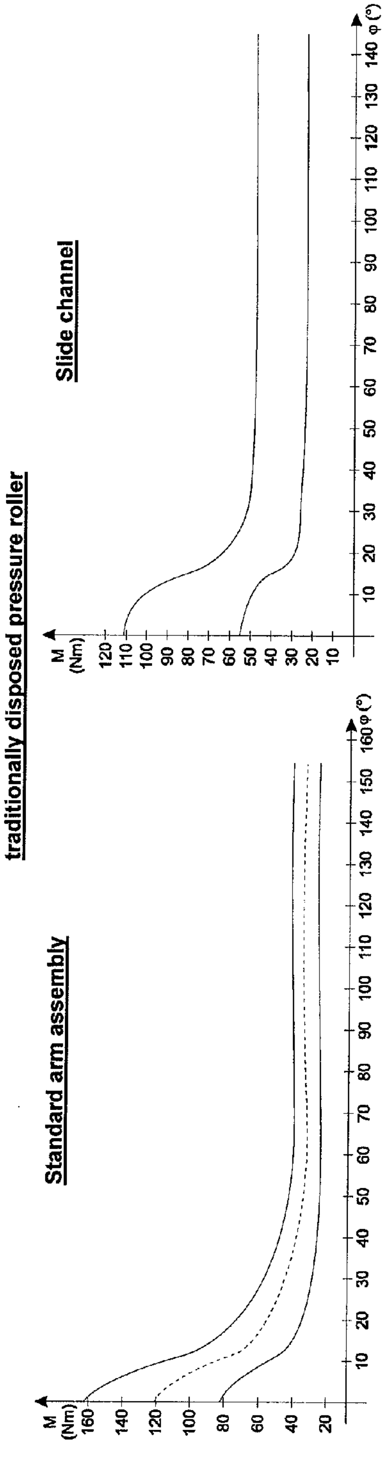
FIG. 1D shows two diagrams, illustrating the torque characteristics during the opening and closing of a swing leaf with a traditional cam mechanism.

FIG. 1D shows two diagrams, which illustrate the torque characteristics for a cam mechanism with a traditionally disposed pressure roller in slide channel operation, respectively in standard arm assembly operation. The respective upper characteristic line shows the torque characteristic during an opening operation, and the lower characteristic line shows the torque characteristic during a closing operation. The differences of these characteristic lines are based on the fact that the opening is effected against the force of a closer spring. As can be seen, at an opening angle ϕ of 0°, the torque M is substantially higher (approximately 162 Nm) during the opening in a standard arm assembly operation than in a slide channel operation (approximately 111 Nm). During closing at an opening angle ϕ of 0° in a standard arm assembly operation, the torque M amounts to approximately 81 Nm and in a slide channel operation to approximately 55 Nm. When comparing the two modes of operation to each other, the differences in the torques M accordingly amount to approximately 51 Nm, respectively 26 Nm. Furthermore, in the standard arm assembly operation, the torque curve initially drops substantially more than the torque curve in the slide channel operation. Thus, the torque curves have different progressions.

Figure 1E:
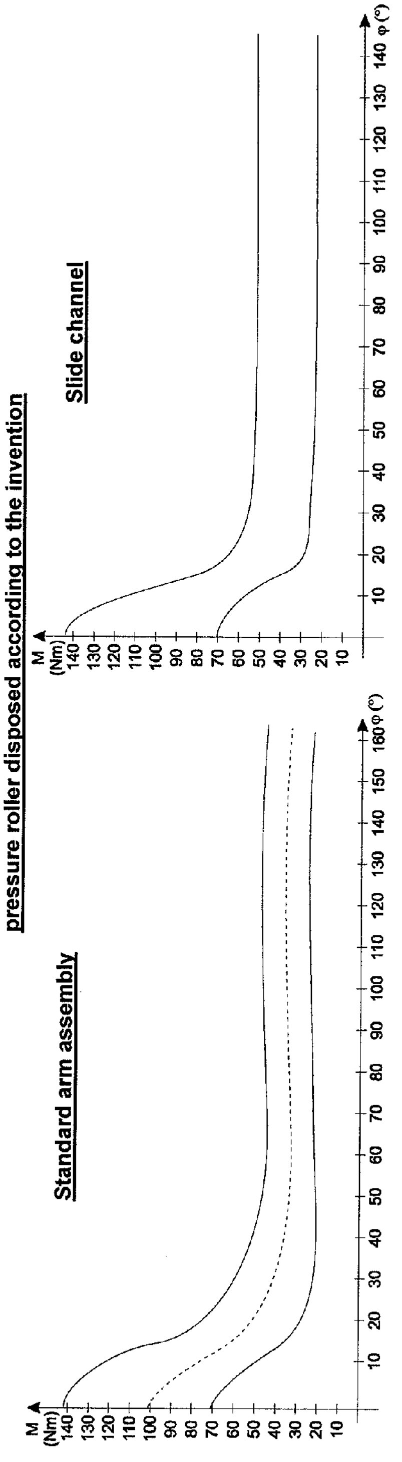
FIG. 1E shows two diagrams, illustrating the torque characteristics during the opening and closing of a swing leaf with a cam mechanism, the pressure roller being offset according to the invention.

FIG. 1E shows torque characteristics, which are achieved if a pressure roller is disposed according to the invention. In the standard arm assembly operation, during opening the torque M amounts to approximately 142 Nm at an opening angle ϕ of 0° and during closing to approximately 70° Nm. In the slide channel operation, during opening the torque M amounts to approximately 143 Nm at an opening angle ϕ of 0° and during closing to approximately 71 Nm. When comparing the two modes of operation to each other, the differences of the torques M amount to no more than approximately 1 Nm, thus they are in a range of between 0.7% and 1.5% with regard to a respective reference torque in one mode of operation. In addition, it can be seen that the torque curve in a standard arm assembly operation does not drop as sharply at an opening angle ϕ of 0° as in FIG. 1E. The shapes of the torque curves, namely the torque characteristics in the two modes of operation rather approximate.

As a result, in the mentioned modes of operation, the torques M are identical or very similar at a respective opening angle ϕ. When comparing the modes of operation to each other, the difference of the torque values at a respective opening angle ϕ is preferably located in a range of maximum 10%, preferably 5% or less with regard to one of the applied torques in one of the modes of operation. Adapting the torque curves to each other furthermore results in the fact that the force, required for opening a swing leaf, is almost equal in the modes of operation.

Figure 1F:
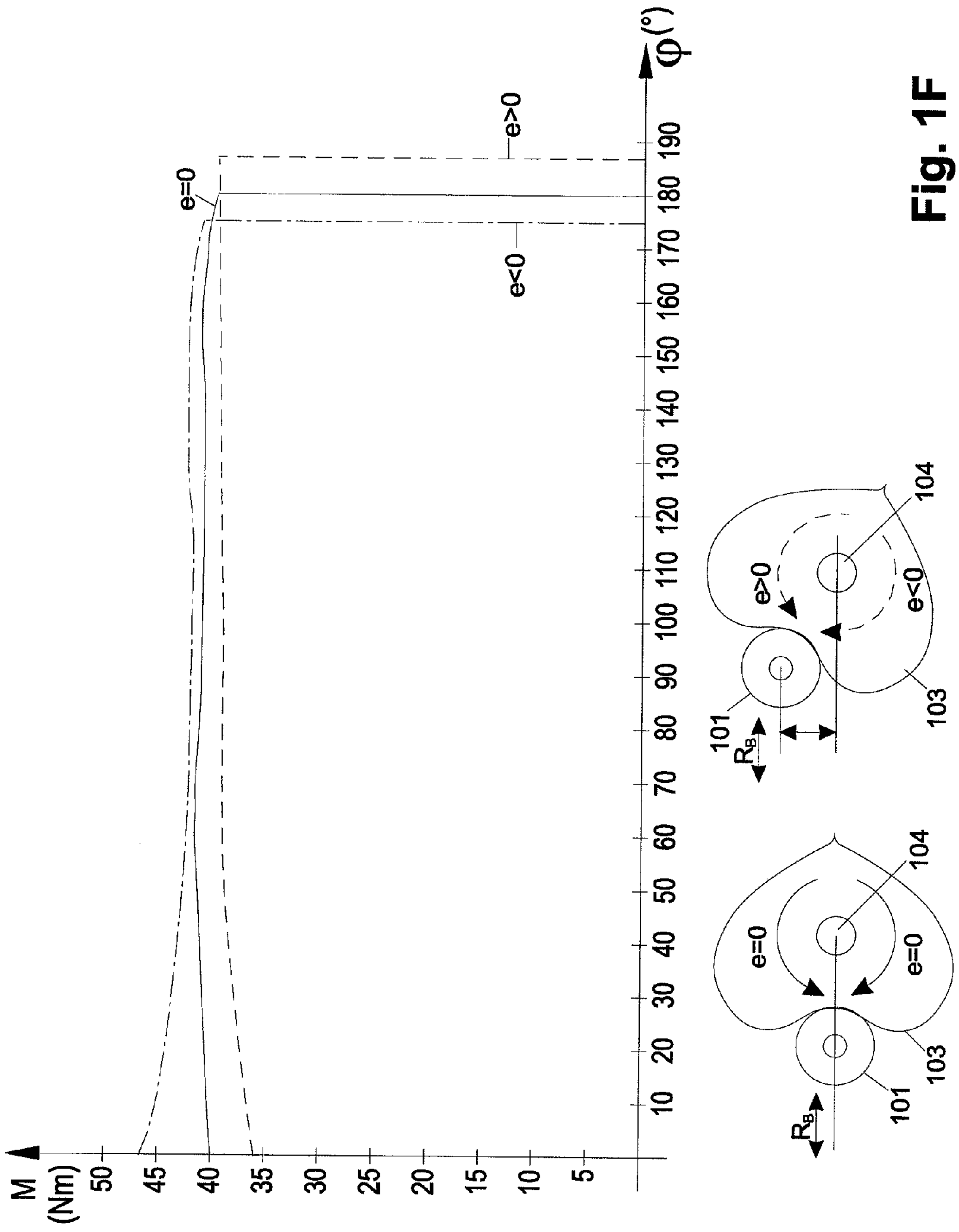
FIG. 1F is a diagram, showing the characteristics of torques as a function of the opening angle with a cam mechanism in a standard arm assembly operation for different positions of the pressure roller.

As exemplarily illustrated in FIG. 1F, on account of offsetting the pressure roller 101, the torque M can not only be increased at an opening angle ϕ of 0°. It is likewise possible to achieve that, at an opening angle ϕ of 0°, the torque M is less than an average torque applied to a swing leaf during a moving operation.

In a traditional disposition of a pressure roller 101, as illustrated on the left bottom side in FIG. 1F, a torque characteristic is achieved as illustrated by the solid line in the diagram, and in fact in both directions of rotation of a cam disc 103 as indicated on the left bottom side. The pressure roller 101 is disposed such that a path of motion of the pressure roller 101, defined by a direction of movement $R_B$, intersects the axial center of the output shaft 104. Thus the pressure roller is located centrically with regard to the output shaft 104, a so-called eccentricity coefficient e is equal to 0.

Offsetting the pressure roller, as illustrated in the center bottom of FIG. 1F, during the rotation of the cam disc 103 along a first, according to FIG. 1F upper portion of the running surface of the cam disc 103 in one direction, which is indicated by a dashed arrow, causes a torque characteristic according to the characteristic line, which is illustrated as dashed in the diagram. In this particular case, a torque M is increased at an opening angle ϕ of 0°. An offset measure of the pressure roller 101, according to FIG. 1F with regard to this direction of rotation of the cam disc 103, represents a so-called positive eccentricity (e>0). Preferably, this direction of rotation is employed in the slide channel operation.

During rotation of the cam disc 103 along the other, according to FIG. 1F lower portion of the running surface of the cam disc 103 in a direction, which is indicated by means of an arrow represented by a dash-dotted line, a torque characteristic according to the characteristic line in the diagram is achieved, which is illustrated by means of a dash-dotted line. In this particular case, the torque M is reduced at an opening angle ϕ of 0°. The offset measure of the pressure roller 101, according to FIG. 1F with regard to this direction of rotation, represents a so-called negative eccentricity (e<0).

A swing leaf operator 10 has a closer portion 100.

Figure 2A:
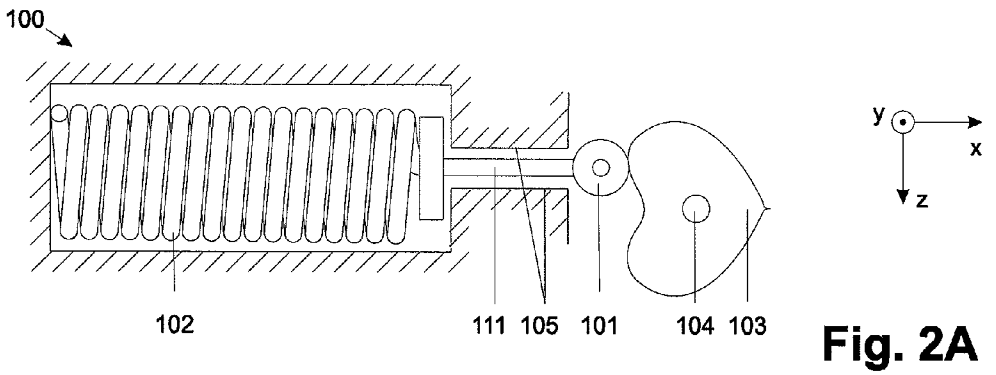
FIGS. 2A to 2C show a closer portion of a swing leaf operator with a cam disc assembly according to a first embodiment of the invention with different variants.
Figure 2B:
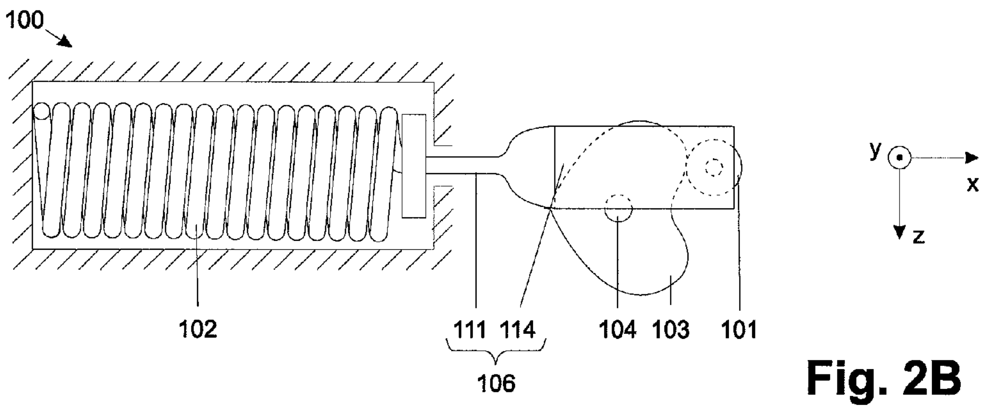
Figure 2C:
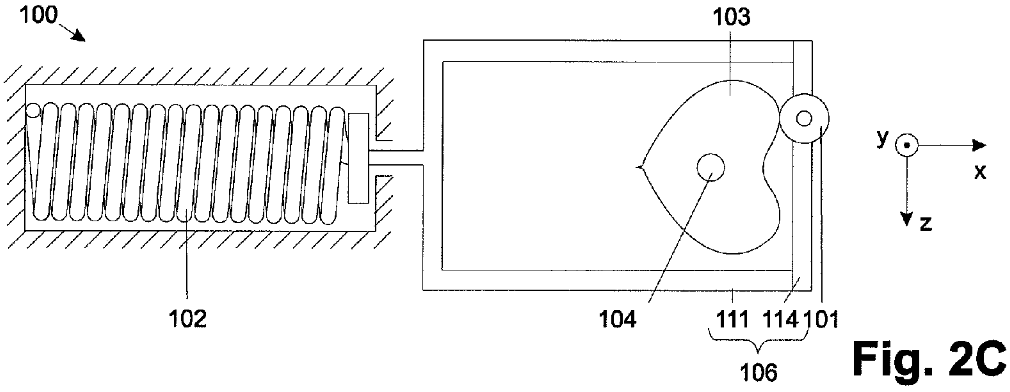

A closer portion 100 according to a first embodiment of the invention, as shown in the FIGS. 2A to 2C, has a pressure roller 101, which is pressed against a cam disc 103 by means of a closer spring 102, which disc is torsion-resistantly disposed on an output shaft 104 of the closer portion 100.

The pressure roller 101 is disposed such that a line, which is substantially defined by the translational movement thereof, bypasses the axial center of the output shaft 104.

As shown in FIG. 2A, the closer spring 102 is disposed on a side of the cam disc 103, on which the pressure roller 101 is likewise disposed. The closer spring 102 presses the pressure roller 101 against the cam disc 103 by means of an operational connection in the shape of a connecting rod 111. The connecting rod 111 is guided in a guide 105 such that it is only movable translationally towards the cam disc 103 or away from it. The force of the closer spring 102 acts in the +x-coordinate direction.

As an alternative, as shown in FIG. 2B, the closer spring 102 can be disposed on a side of the cam disc 103, which is located opposite the side on which the pressure roller 101 is disposed. At the end oriented towards the pressure roller 101, the closer spring 102 is coupled to a link-plate unit 106. The link-plate unit 106 has at least one connecting rod 111 and one link-plate 114 and extends in the x-coordinate direction. The link-plate unit 106 passes the cam disc 103 at a predetermined distance. The pressure roller 101 is freely rotatably supported within the link-plate 114. The force of the closer spring 102 acts in the −x-coordinate direction. With regard to the cam disc 103, the pressure roller 101 is disposed analogously to FIG. 2A.

The link-plate unit 106 may be configured, as shown in FIG. 2C, such that the at least one connecting rod 111 laterally bypasses the cam disc 103 in an x-z-plane, when seen in the x-coordinate direction. With regard to the cam disc 103, the pressure roller 101 is disposed analogously to FIG. 2A.

Figure 3A:
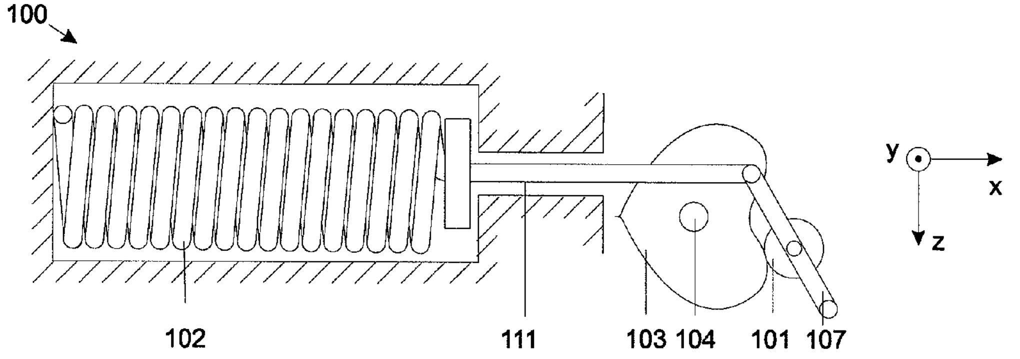
FIGS. 3A, 3B show a closer portion of a swing leaf operator with a cam disc assembly according to a second embodiment of the invention with different variants.

In a closer portion 100 according to a second embodiment of the invention shown in FIG. 3A, the closer spring 102 is in operational connection with a pressure roller 101 by means of a transmission gear, which preferably has the shape of a lever assembly. Via a lever 107, the closer spring 102 pulls the pressure roller 101 into the direction of the cam disc 103, thus acting in the −x-coordinate direction. Even if the path of motion of the pressure roller 101 describes a circle, it will bypass the axial center of the output shaft 104 along the entire path of motion.

Figure 3B:
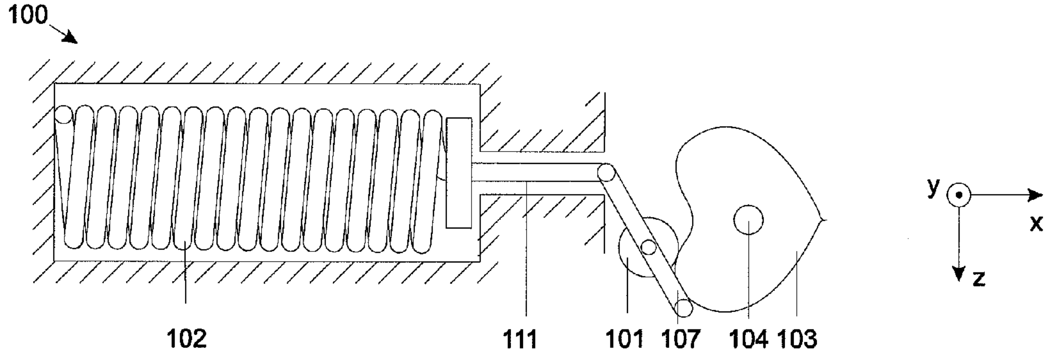

FIG. 3B illustrates an alternative lever assembly. In contrast to FIG. 3A, in this case, the closer spring 102 presses the pressure roller 101 against the cam disc 103 by means of a lever 107, this means in the +x-coordinate direction. With regard to the pressure roller 101, the same findings apply as for FIG. 3A.

Figure 4:
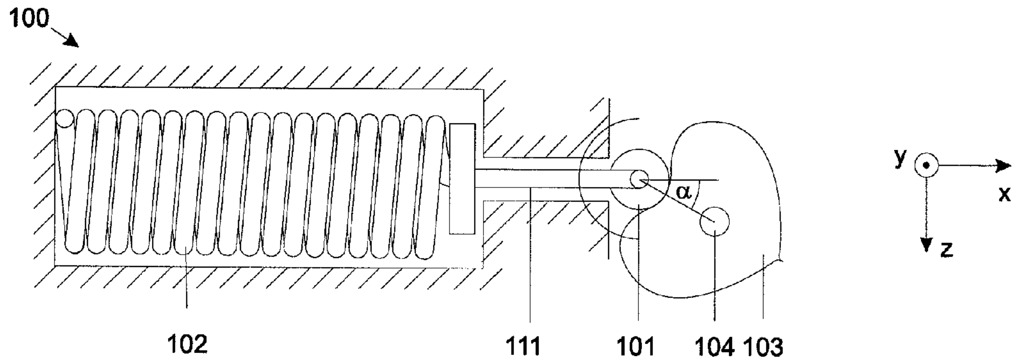
FIG. 4 shows a closer portion of a swing leaf operator with a cam disc assembly according to a third embodiment of the invention.

In a closer portion 100 according to a third embodiment of the invention shown in FIG. 4, it is intended to dispose the assembly of closer spring 102 and the operational connection thereof with the pressure roller 101 (for example the lever 107) rotating about a point, this means at an angle α, which point does not correspond to the axial center of an output shaft 104 of the closer portion 100.

Figure 5:
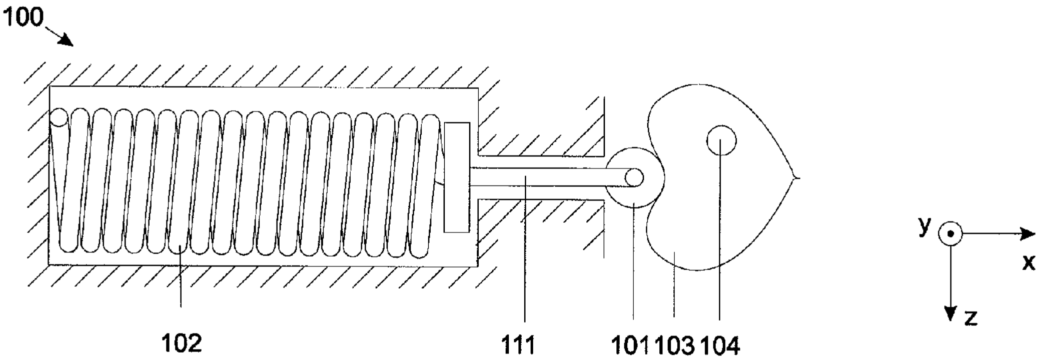
FIG. 5 shows a closer portion of a swing leaf operator with a cam disc assembly according to a fourth embodiment of the invention.

A closer portion 100, according to a fourth embodiment of the invention shown in FIG. 5, has a cam disc 103, wherein the reception for the output shaft 104 is disposed off-center. When seen in a direction along an axial extension of the output shaft 104, this means that the reception for the output shaft 104 is disposed next to a connecting line between the pressure roller 101 and the axial center of an output shaft, which would be disposed in the traditional manner.

In addition, it could be intended to configure the pressure roller 101 to be adjustable with regard to the direction of movement in a mounted condition of the swing leaf operator 10, this means after assembling.

Figure 6:
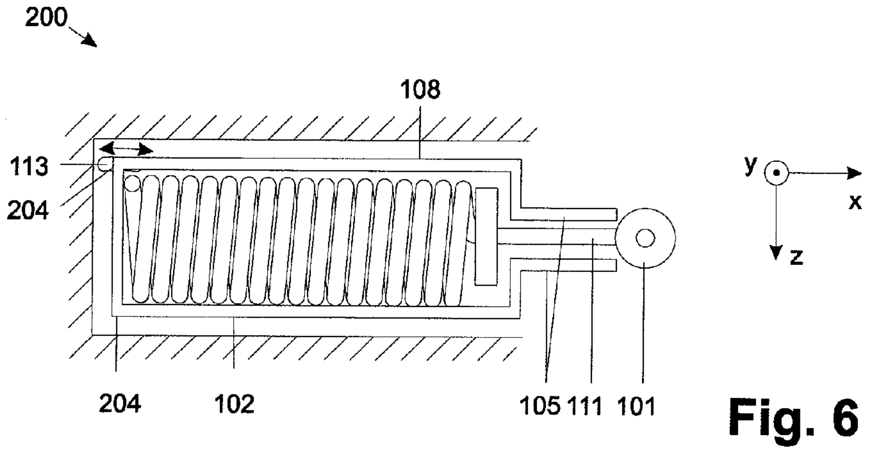
FIG. 6 shows a device for adjusting the direction of movement of a pressure roller with regard to a cam disc according to a fifth embodiment of the invention.

A device 200, according to a fifth embodiment of the invention, for adapting the position of a pressure roller 101 with regard to a cam disc 103 in the mounted condition of the swing leaf operator 10, is illustrated in FIG. 6. A closer spring housing 108, accommodating the closer spring 102, is freely pivotably supported at one location. At another location, the closer spring housing 108 is supported such as to be lockable in an oblong hole 113. Preferably, the locking is realized by means of a locking screw 204. The oblong hole 113 is formed according to the path of motion which the locking screw 204 will follow during pivoting of the closer spring 102. A spring abutment of the closer spring 102 can be employed instead of the closer spring housing 108.

Preferably, the pressure roller 101 is operationally connected to the closer spring 102 by means of a connecting rod 111. The connecting rod 111 is supported in a guide 105 and can be translationally moved towards the closer spring 102 and away from it.

As an alternative, the connecting rod 111 is inserted into the closer spring 102 and is translationally guided by means of the closer spring 102. In this case, a closer spring housing 108 can be foregone.

The pressure roller 101 is freely rotatably mounted to the end of the connecting rod 111 facing away from the closer spring 102.

Figure 7A:
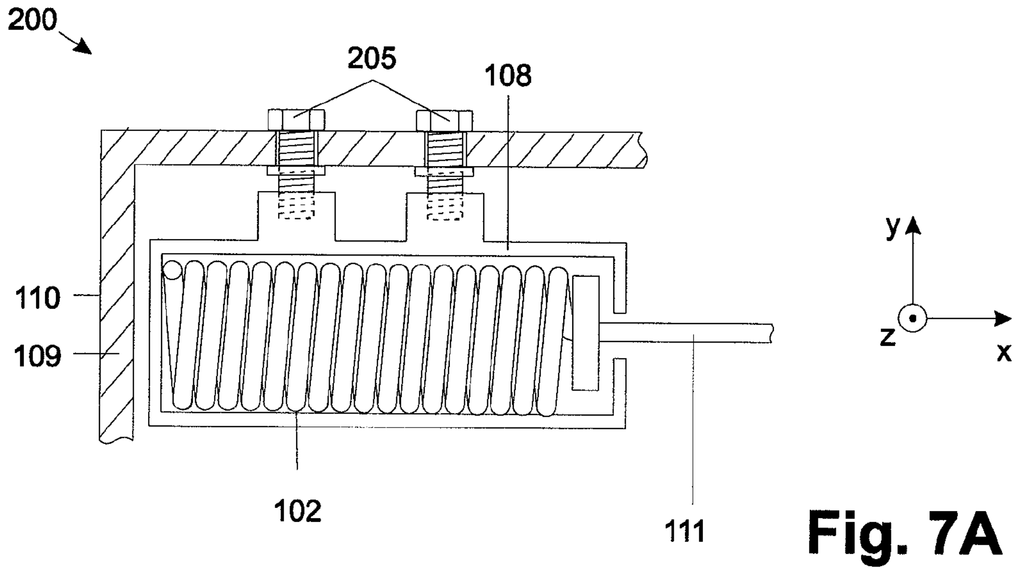
FIGS. 7A to 7I show a device for adjusting the direction of movement of a pressure roller with regard to a cam disc according to a sixth embodiment of the invention with different variants.

Instead of pivoting said assembly, as shown in FIGS. 7A to 71, a translational displacement is provided in an adjusting device, according to a sixth embodiment of the invention.

According to a first variant, as shown in FIG. 7A, the above described assembly is displaced as a whole. The position of the closer spring housing 108 of the closer spring 102 is secured by means of adjusting screws 205. The adjusting screws 205 are freely rotatably supported on one side of the closer housing 109 such that they do not change their location with regard to the closer housing 109 in the direction of their longitudinal extension, this means in the y-coordinate direction in FIG. 7A. By means of rotating the adjusting screws 205, the closer spring housing 108 and thus the entire assembly can be displaced in the y-coordinate direction such that a displaceability of the assembly according to FIG. 2A is achieved.

If just one adjusting screw 205 is rotated, a pivoting of the assembly is likewise possible to a certain extent.

Under certain circumstances, two independently rotatable adjusting screws 205 may cause jamming such that an adjustment of the assembly is no longer possible.

Figure 7B:
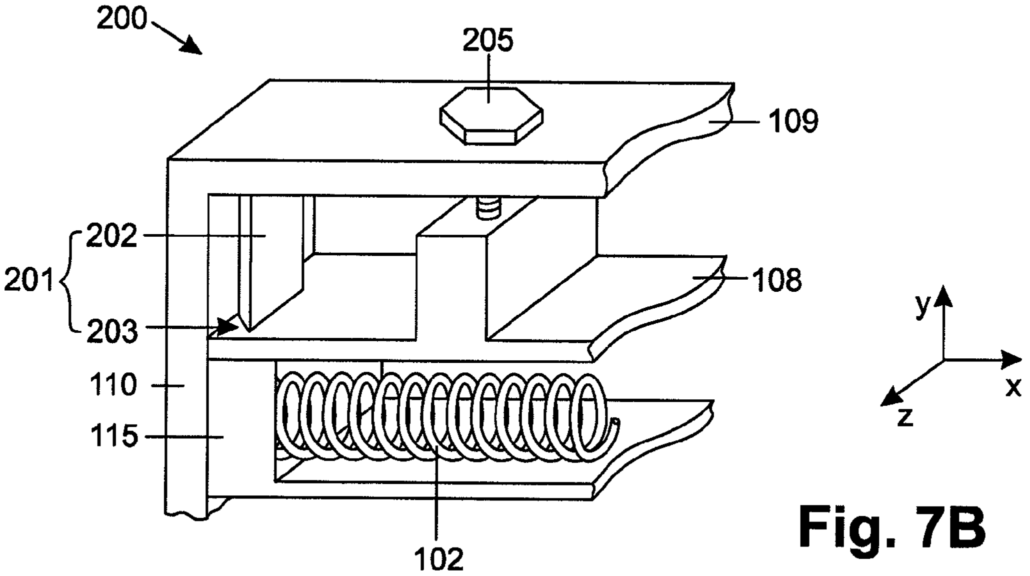

This is the reason why in a second variant, illustrated in FIG. 7B, only one adjusting screw 205 is provided. A part of a guide 201, preferably in the shape of a guiding projection 202, furthermore preferably as a part of a dovetail guide, is provided on one inner side of at least one lateral wall 115 of the closer housing 109. The other part of the guide 201, preferably configured in the shape of a groove 203, is formed on a lateral wall 115 of the closer spring housing 108. Advantageously, two guides 201 are formed and provided at two different lateral walls 110, 115 such as to avoid tilting. The single adjusting screw 205 is preferably formed in the same way as in the embodiment according to FIG. 7A.

Figure 7C:
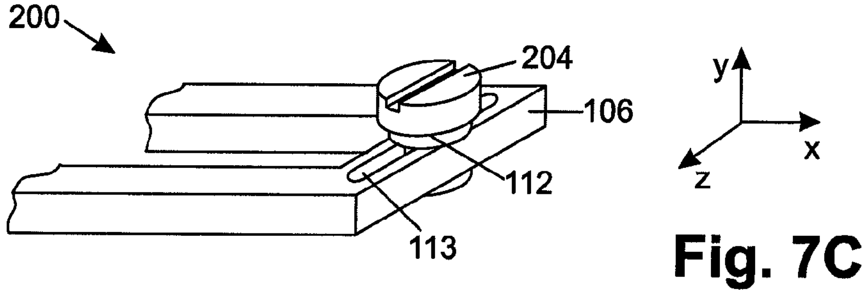

If the pressure roller 101 is accommodated in a link-plate unit 106 as illustrated in FIGS. 2B and 2C, according to a third variant of this embodiment of the invention illustrated in FIG. 7C, the pressure roller 101 is displaceably accommodated in an oblong hole 113 configured in the link-plate unit 106. Preferably, the pressure roller 101 is freely rotatably disposed on a bearing journal 112. The bearing journal 112 in turn is accommodated within the oblong hole 113 and securable within the oblong hole by means of a locking screw 204. This means that just the position of the pressure roller 101 will be modified, and not the one of the entire assembly.

Figure 7D:
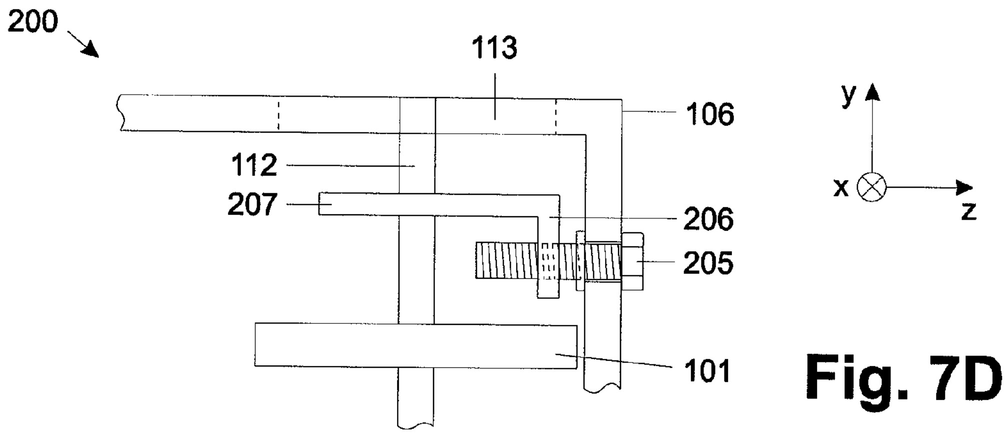

In a fourth variant according to FIG. 7D, the pressure roller 101 of the closer portion 100, in a stationary manner and freely rotatably, is mounted to a mounting bracket 207, and not to a link-plate unit 106. The mounting bracket 207 is guided and movable within the link-plate unit 106, preferably within an oblong hole 113. The mounting bracket 207 has a locking abutment 206, which presents a threaded bore extending towards the link-plate unit 106. The link-plate unit 106 has a through opening in such a way that a locking screw 204 is screwed into the threaded bore of the locking abutment 206 from an outer side of the link-plate unit 106 while passing through the through opening. On account of a rotation of the locking screw 204, the mounting bracket 207 and thus the pressure roller 101 can be moved towards the link-plate unit 106 or away from it and can thus be displaced in relation to the cam disc 103.

Figure 7E:
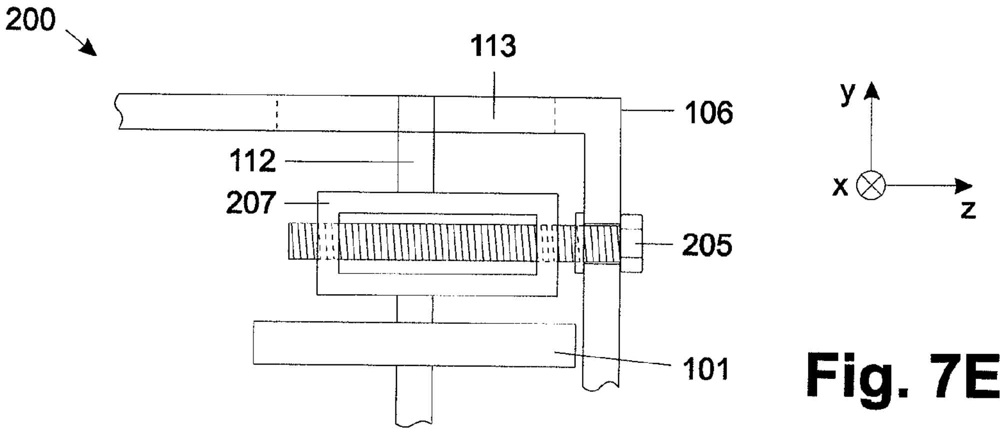

A fifth variant is illustrated in FIG. 7E. In this case, the mounting bracket 207 has a rectangular cross-section with a hollow space, when seen in the x-coordinate direction. Obviously, the mounting bracket 207 can be executed as a solid material block. The mounting bracket 207 has a portion extending in the y-coordinate direction towards the link-plate unit 106. The end of this portion, facing away from the mounting bracket 207, is preferably guided in an oblong hole 113, which is formed within the link-plate unit 106 and extends in the z-coordinate direction.

As an alternative, instead of an oblong hole 113, an oblong hole-shaped opening can be formed on the inner side of the link-plate unit 106 in an x-z-plane. This means that the shape of the oblong hole is not bored all through the link-plate unit 106. On the outer side, the link-plate unit 106 has preferably a continuous surface, at least at this location.

Figure 7F:
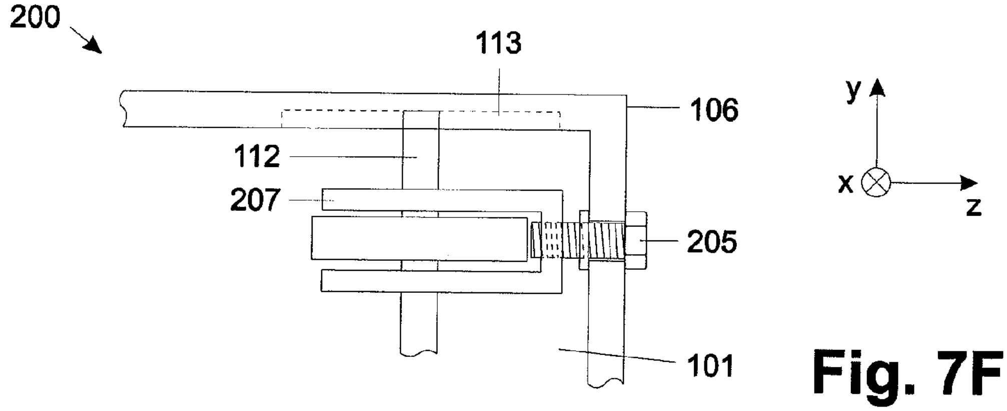

A sixth variant consists in a link-plate solution illustrated in FIG. 7F. A link-plate 114 surrounds the pressure roller 101 in a y-z-plane. An adjusting screw 205 is preferably disposed in an x-z-plane, in which the pressure roller 101 is located.

Furthermore, in order to guarantee a reliable adjustment, in the variants shown in FIGS. 7D to 7F, it may be provided to have the adjusting screw 205 extend further towards an inner side of the lateral wall 115 and support it there, a location, which is opposite the lateral wall, through which the adjusting screw 205 is penetrating.

Figure 7G:
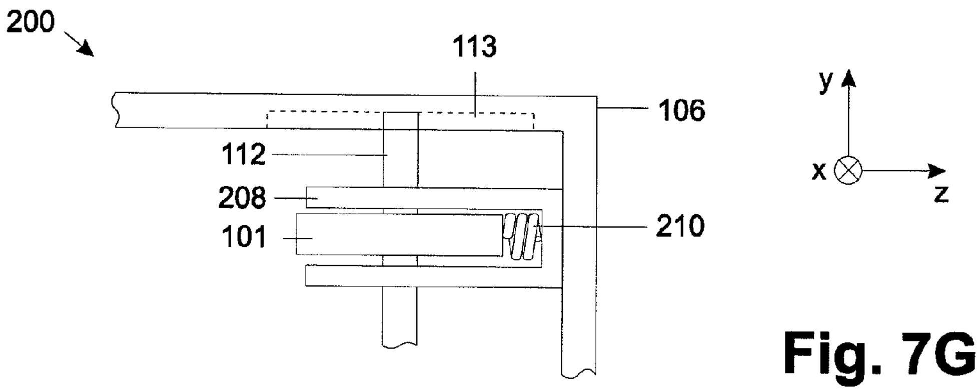

As an alternative or in addition, according to a seventh variant illustrated in FIG. 7G, it is intended to employ a bearing journal 112, on which the pressure roller 101 is disposed. Preferably by means of a bearing bushing, an abutment member 208 is slipped onto the bearing journal 112, which is accommodating the pressure roller 101. Thus the bearing journal 112 is freely rotatably disposed with regard to the abutment member 208. Preferably, the abutment member 208 has a bearing bushing, in which the bearing journal 112 is accommodated. The bearing bushing preferably comprises a ball bearing, a rolling bearing or a friction bearing for the bearing journal 112.

Another abutment member 209, in which an abutment spring 210 in the shape of a compression spring is accommodated, is disposed at least at one side of the link-plate unit 106. During a rotation of the cam disc 103 in the direction of the abutment member 209, the pressure roller 101 is urged into this direction. On account of the very strong force of the closer spring 102, the pressure roller 101 is not urged back into the initial position thereof by means of the abutment spring 210. It is only when the non illustrated cam disc 103 rotates backwards that the pressure roller 101 reaches again the initial position thereof, namely on account of the shape of the running surface of the cam disc 103 and of the force of the closer spring 102.

Figure 7H:
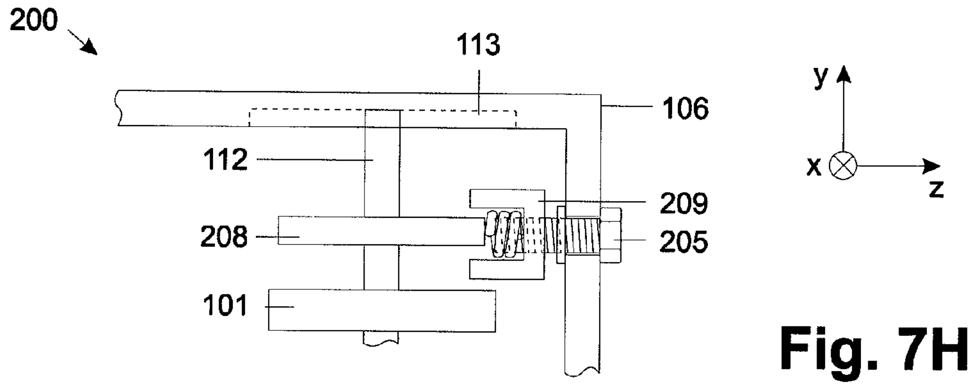

The abutment member 209 may be mounted stationarily at the link-plate unit 106 or, as illustrated in FIG. 7H, may be disposed movable in the direction of the pressure roller 101 and away from it by means of an adjusting screw mechanism.

Figure 7I:
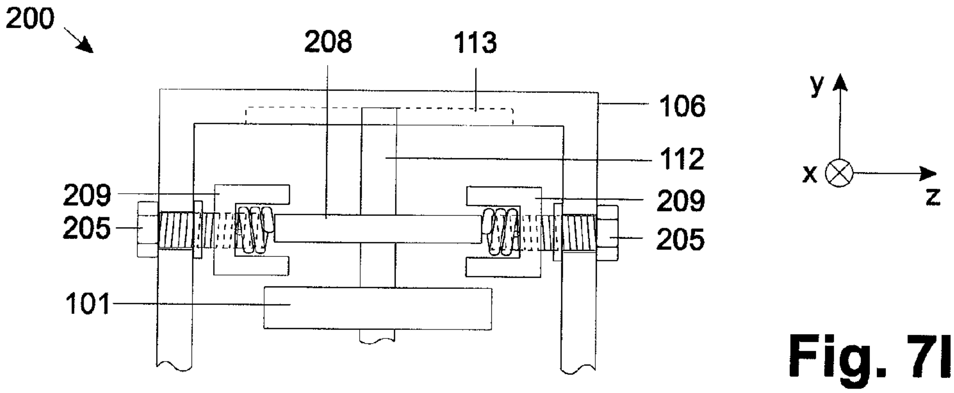

According to a variant illustrated in FIG. 7I, two abutment members 209 are provided, which are stationarily or displaceably disposed respectively at an inner side of two faces of the link-plate unit 106 located opposite each other. Preferably, the abutment members 209 are operationally connected to an abutment member 208 by means of one abutment spring 210 respectively, which has the shape of a compression spring.

Instead of the link-plate unit 106, lateral walls 115 of a closer spring housing 108 or lateral walls 110 of a closer housing 109 can be employed for mounting or supporting the adjusting screws 205, respectively the locking abutments 206.

Figure 8:
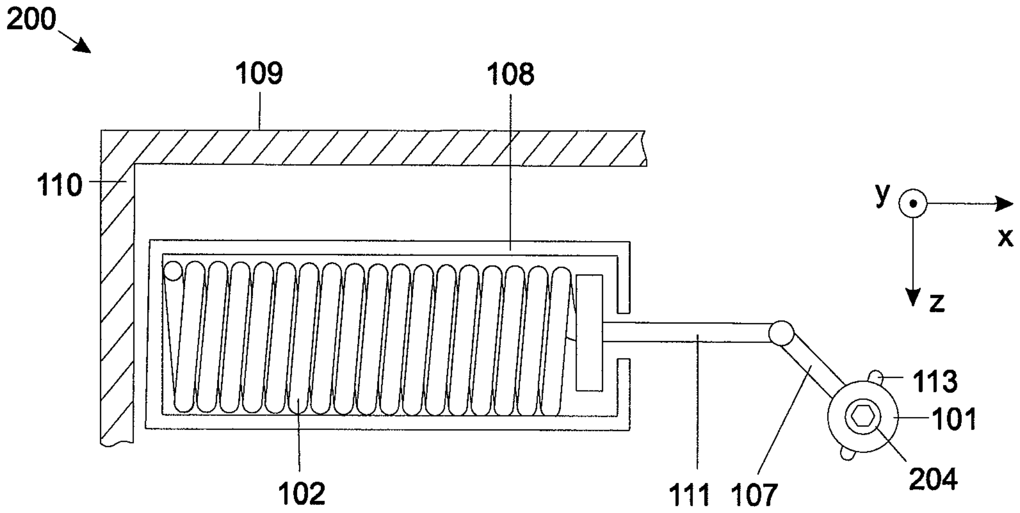
FIG. 8 shows a device for adjusting the direction of movement of a pressure roller with regard to a cam disc according to a seventh embodiment of the invention.

With regard to the lever assemblies shown in FIGS. 3A and 3B, in an adjusting device 200 according to a fourth embodiment of the invention shown in FIG. 8, the pivotably supported location of the lever 107, which is not coupled to the connecting rod 111, is preferably displaceably supported within an oblong hole 113. The accommodation and locking of this location of the lever 107 is preferably realized in the same manner as for the pressure roller 101 in the above described embodiment.

Figure 9A:
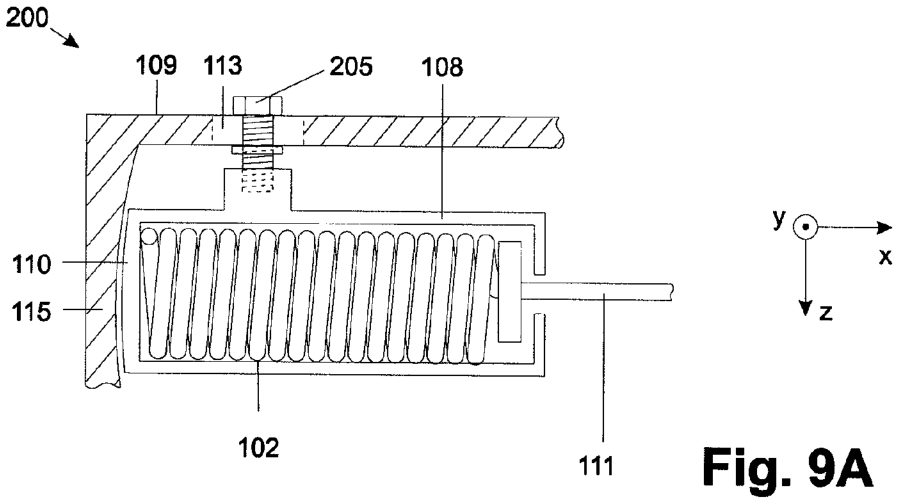
FIGS. 9A to 9D show a device for adjusting the direction of movement of a pressure roller with regard to a cam disc according to an eighth embodiment of the invention with different variants.
Figure 9B:
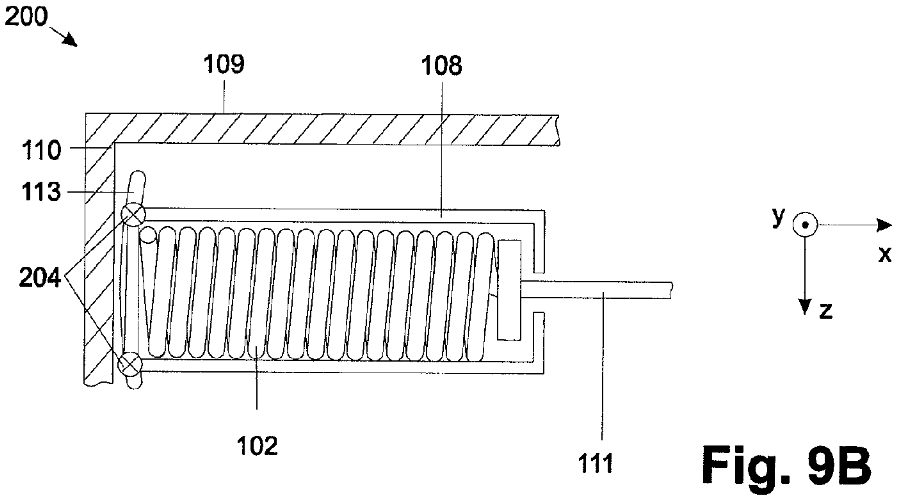

In order to achieve a pivoting of the assembly according to FIG. 4, an adjusting device 200 according to an eighth embodiment of the invention is provided and shown in FIG. 9A. The surface of the closer spring housing 108 or of the spring abutment, facing away from the pressure roller 101 and oriented toward the closer housing 109, and the inner side of the lateral wall 115 of the closer housing 109, oriented towards this end, adjoin each other at least at one location. Based on this adjoining, the end of the closer spring housing 108 or of the spring abutment is guided by means of the inner side of the lateral wall 115. Preferably, again only one adjusting screw 205 is screwed into the closer spring housing 108 or the spring abutment, analogously to the above description, from one outer side of the closer housing 109. A pivoting of the assembly is achieved by means of rotating the adjusting screw 205.

Figure 9C:
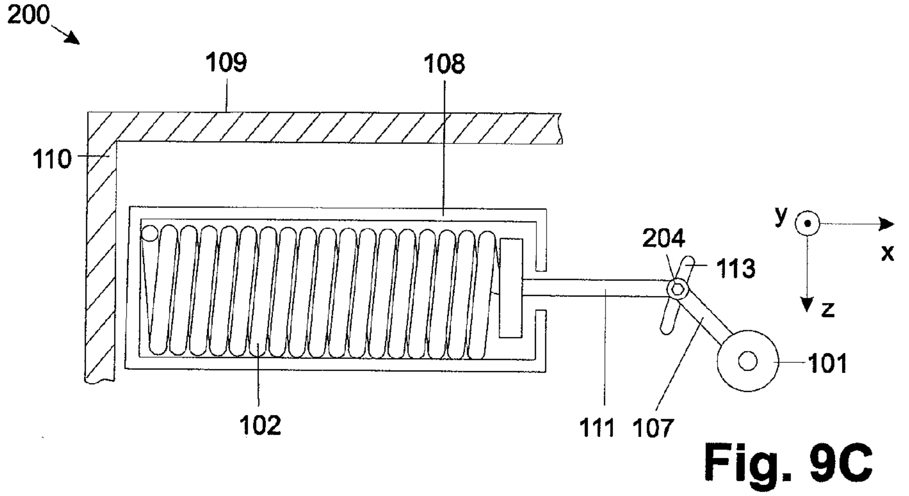

As an alternative, as illustrated in FIG. 9C, the operational connection between the closer spring 102 and the pressure roller 101 is made to be not rigid. Preferably, the operational connection consists of a connecting rod 111 and a lever 107, which are pivotably coupled to each other. With the respective end, facing away from the pivot point, the connecting rod 111 and the lever 107 are coupled to a spring abutment respectively to the pressure roller 101. The pivot point is preferably configured by means of a not illustrated bearing journal 112, which is guided in an oblong hole 113 and lockable therein.

As an alternative, as illustrated in FIG. 9C, the operational connection between the closer spring 102 and the pressure roller 101 is made to be not rigid. Preferably, the operational connection consists of a connecting rod 111 and a lever 107, which are pivotably coupled to each other. With the respective end, facing away from the pivot point, the connecting rod 111 and the lever 107 are coupled to a spring abutment respectively to the pressure roller 101. The pivot point is preferably configured by means of a not illustrated bearing journal 112, which is guided in an oblong hole 113 and lockable therein.

Figure 9D:
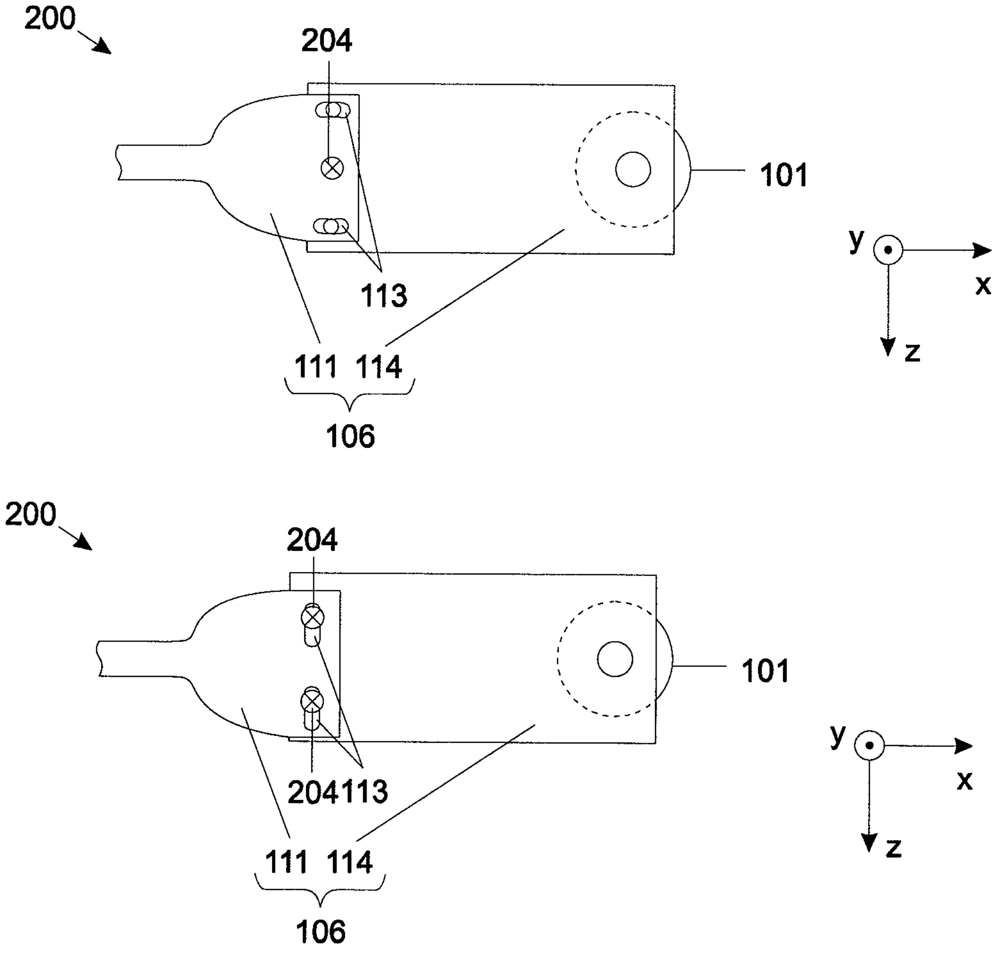

Preferably, at least one connecting rod 111 is provided in a link-plate unit 106. According to another variant of the eighth embodiment of the invention, the connecting rod 111, as shown in FIG. 9D, has guiding holes in the shape of oblong holes 113. The link-plate 114 is secured in the oblong holes 113 by means of locking screws 204. As an alternative, only one locking screw 204 is provided. The shapes of the guiding holes determine the displacement path of the link plate 114 and thus the displacement path of the pressure roller 101 with regard to the cam disc 103.

Figure 10:
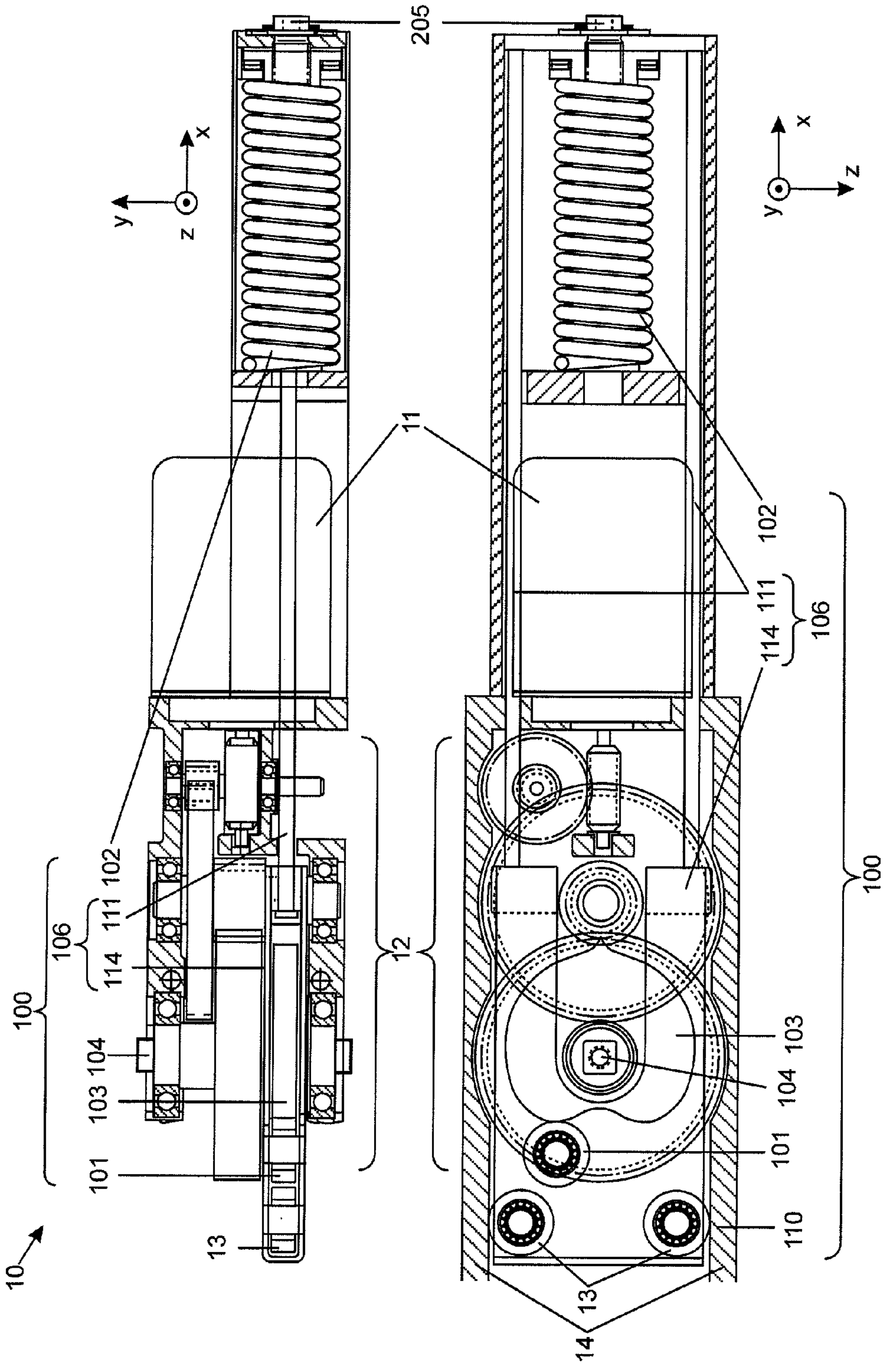
FIG. 10 shows a swing leaf operator according to a ninth embodiment of the invention.

FIG. 10 shows a swing leaf operator 10. A drive motor 11 is in rotational engagement with an output shaft 104 by means of a gear 12. Preferably, the drive motor 11 drives the output shaft via a gear 12, which preferably has the shape of a worm gear. However, any kind of rotational operational connection is possible.

A closer spring 102 is disposed at the end of the drive motor 11, facing away from the output shaft 104. Preferably, the spring is configured as a compression spring. The end of the closer spring 102, oriented towards the drive motor 11, is stationarily mounted. Preferably, the other end has a mechanism for adjusting the initial tension of the closer spring 102, preferably in the shape of an adjusting screw 205.

At least one connecting rod 111, which extends towards the cam disc 103 such that it bypasses the drive motor 11 and the parts of the gear, is attached at the other end of the closer spring 102. At the end facing away from the closer spring 102, the connecting rod(s) 111 is, respectively are coupled to a link-plate 114.

The link plate 114 is configured such that it bypasses the gear 12 and the output shaft 104. Preferably, a pressure roller 101 is stationarily and freely rotatable mounted to the end of the link plate 114, facing away from the closer spring 102.

By means of the link-plate unit 106, the closer spring 102 presses the pressure roller 101 against the running surface of the cam disc 103.

Furthermore, the link-plate unit 106 may preferably present two guiding rollers 13, which are mounted in such a way that they protrude with regard to the link plate 114 and are guided within a guide 14 such that the link-plate unit 106 is movable only along a predetermined path.

Figure 11:
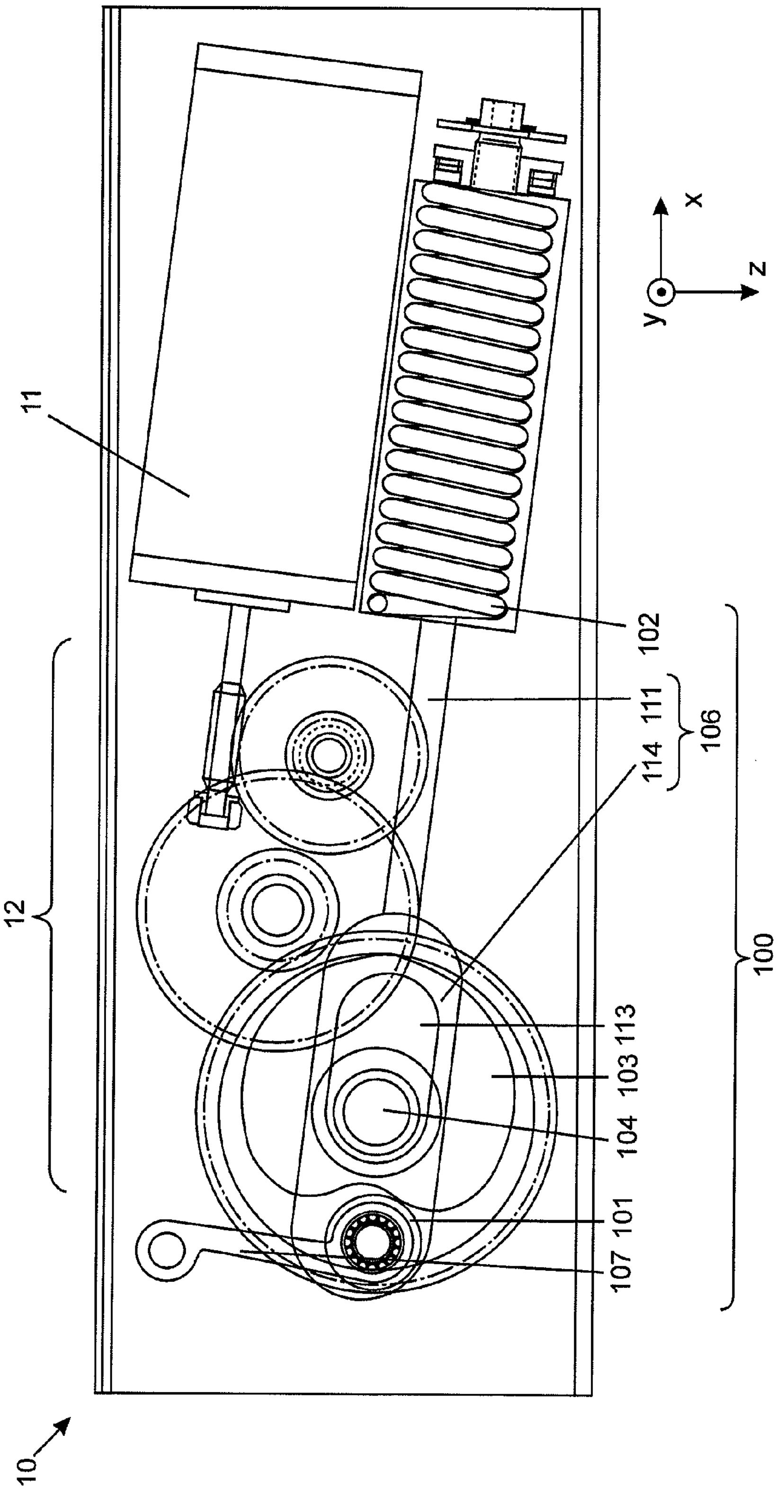
FIG. 11 shows a swing leaf operator according to a tenth embodiment of the invention.

A swing leaf operator 10, according to a tenth embodiment of the invention shown in FIG. 11, comprises a link-plate unit 106, which only comprises one connecting rod 111. The guiding of the link-plate unit 106 is achieved by means of an oblong hole 113 in the link plate 114, by means of which the link plate 114 surrounds or encloses the output shaft 104. Preferably, a bearing bushing having for example a ball bearing, a rolling bearing or a friction bearing is disposed on the output shaft 104. The bearing bushing has an external diameter, which is substantially identical to the interior dimension of a hollow space or of an opening formed by the oblong hole 113, such that the bearing bushing is supported in a guided manner. The pressure roller 101 is preferably pivotably supported via a lever 107.

Figure 12:
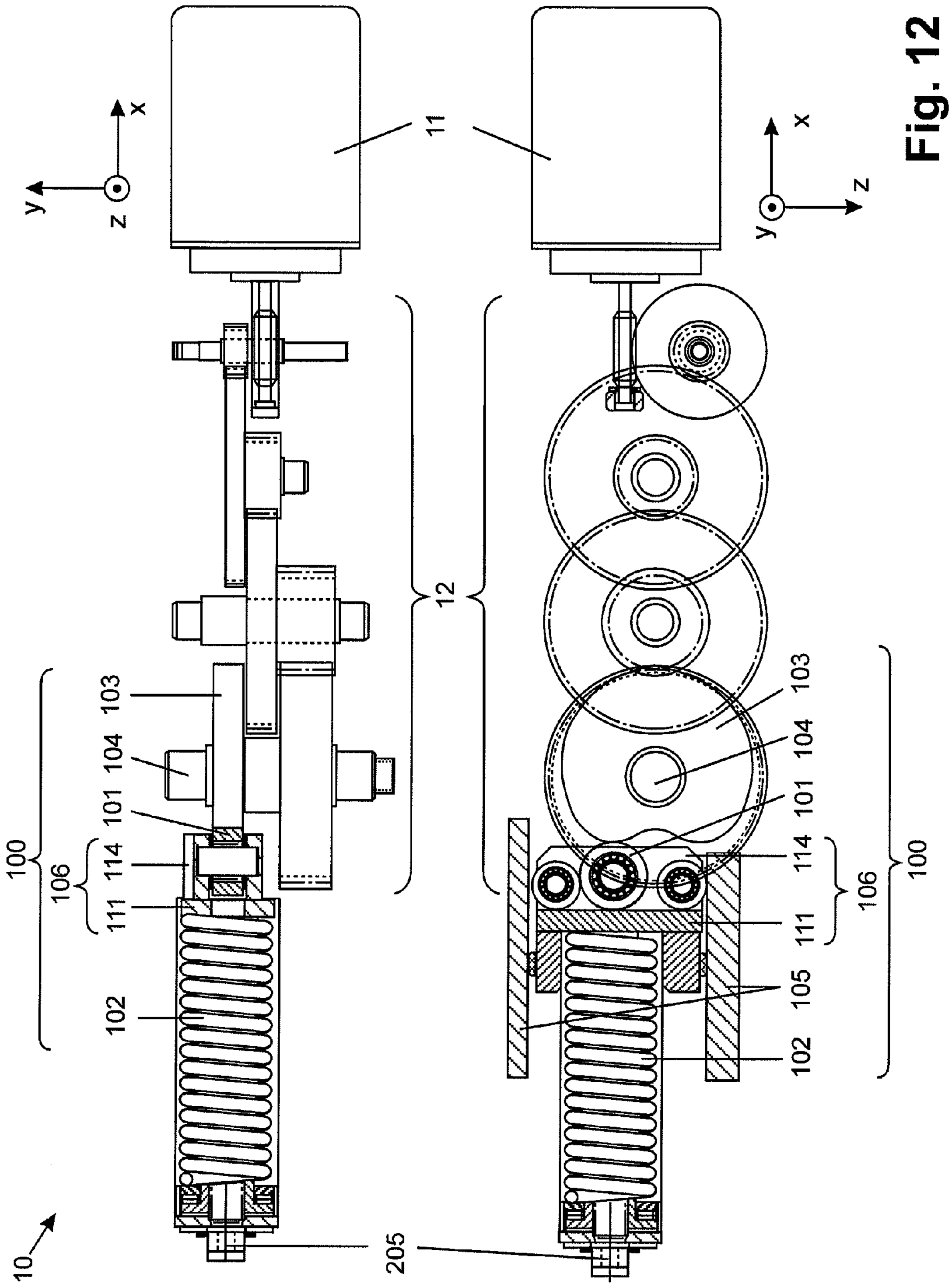
FIG. 12 shows a swing leaf operator according to an eleventh embodiment of the invention

A swing leaf operator 10, according to an eleventh embodiment of the invention, is illustrated in FIG. 12. In contrast to the previous embodiments, the drive motor 11 and the closer spring 102 are disposed at sides of the output shaft 104 facing each other, this means, seen in the y-coordinate direction, on the right hand side, respectively the left hand side of the output shaft 104.

Figure 13:
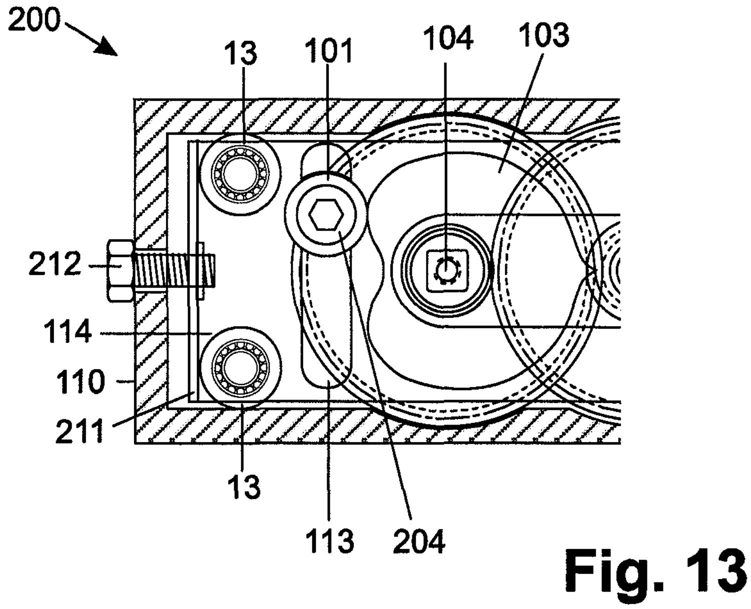
FIG. 13 shows a mechanism for releasing a pressure roller from a cam disc according to an embodiment of the invention.

FIG. 13 shows an embodiment by means of which it is possible to lift so to say the pressure roller 101 from the cam disc 103 and thus to release it therefrom. In this case, the pressure roller 101 is no longer pressed against the cam disc 103. At an end in a direction substantially opposite to the pressure direction, the mounting bracket 207, the link-plate unit 106 or the bearing journal 112, at which the pressure roller 101 is mounted, has a mounting bracket 211 for this purpose. Preferably, the mounting bracket 211 is configured like one of the above described mounting brackets 207. Preferably, one lateral wall 115 presents a through opening extending preferably in x-coordinate direction, for passing a screw 212 there through and for screwing it into the mounting bracket 211. The pressure roller 101 is disposed in an oblong hole 113 and preferably displaceable by means of a bearing journal 112. The bearing journal 112 is locked within the oblong hole 113 by means of a locking screw. The oblong hole 113 may have any shape. The shape is not limited to a straight execution and thus to a simply translational displaceability of the pressure roller 101.

It is thus easier to position the pressure roller 101 more precisely, because no pressure forces need to be overcome, which otherwise would be transferred from the closer spring 102 onto the pressure roller 101.

Furthermore, if the desired position of a screw 204, 205, 212 is reached, preferably a locking device 20 is provided. On account of such a locking device 20, the screw 204, 205, 212 can be fixed in the position thereof.

Figure 14A:
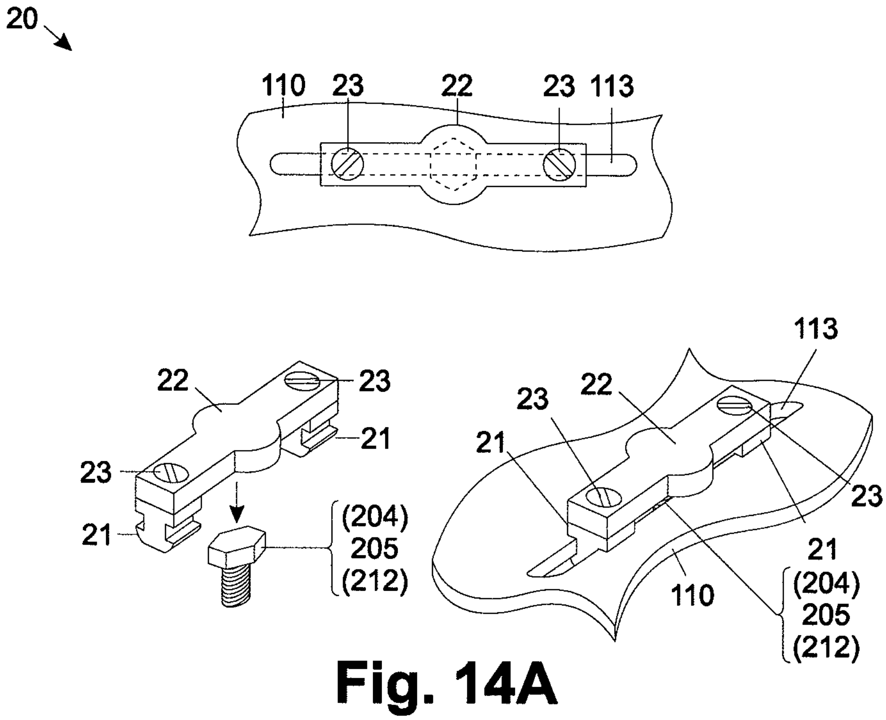
FIGS. 14A and 14B show devices for locking an adjusting screw according to an embodiment of the invention.

As shown in FIG. 14A, preferably two guiding members 21, which are preferably accommodated and guided in an oblong hole 113, are provided in the locking device 20. This may be the oblong hole 113, in which, under certain circumstances, the respective screw 204, 205, 212 can be accommodated. A cage seat 22 is placed on top of the guiding members 21. For attaching, the cage seat 22 preferably presents through openings, which extend in the direction of the respective guiding member 21. The guiding members 21 have at least one attachment opening, preferably in the shape of a threaded bore. Passing through a through opening, respectively one attachment screw 23 is screwed in a respective threaded bore, namely from a side of the cage seat 22 facing away from guiding members 21. However, it is obvious that any other way of non-positive and/or positive connection between the cage seat 22 and the guiding members 21 is possible.

On a side oriented towards the screw 204, 205, 212, the cage seat 22 has a recess, at the location where it meets the screw 204, 205, 212. The recess has a shape that is complementary to the shape of the portion of the screw 204, 205, 212, which is accommodated in the recess. A positive connection between the screw 204, 205, 212 and the cage seat 22 is thereby achieved. On account of the screwing to the guiding members 21, the screw 204, 205, 212 is thus reliably secured in its rotational position. The screw 204, 205, 212 is still displaceable within the oblong hole 113. Thus, a movement of the pressure roller 101, on account of a rotation of the cam disc 103, is still guaranteed.

On account of a rotation of the screw 204, 205, 212, in the variant shown in FIG. 14A, it is perhaps not always guaranteed that the cage seat 22 can be placed every time on top of the screw 204, 205, 212. In order to avoid this problem, according to a second variant shown in FIG. 14B, preferably arc-shaped oblong holes 24 are formed in the cage seat 22 instead of the through openings. It is thereby possible to place the cage seat 22 with regard to the guiding members 21 at an angle of $\beta <> 0°$ and still be able to achieve a positive connection between the cage seat 22 and the screw 204, 205, 212.

If the screw 204, 205, 212 is not accommodated in an oblong hole, the guiding members 21 can be foregone. Instead of this, the attachment screws are screwed into the respective wall, through which the screw 204, 205, 212 is passed.

The adjusting devices 200 according to the FIGS. 3, 4, 9A and 9B are applicable without any difficulty to closer portions 100 according to FIGS. 2A to 3B.

The adjusting devices 200 according to the FIGS. 7A and 7B can be combined with closer portions 100 according to FIGS. 2A to 2C.

The adjusting device 200 is in particular suitable for the closer portion 100 according to FIGS. 3A and 3B, whereas the adjusting device 200 according to FIG. 7C is predestined for a closer portion 100 according to FIG. 2C.

The adjusting device 200 according to FIG. 9D is particularly suitable for closer portions according to FIGS. 2A and 2B.

The spring support of the pressure roller 101 can be combined with the above described adjusting devices 200 and closer portions 100.

The device for releasing the pressure roller 101, shown in FIG. 13, is applicable to any closer portion 100 described above.

Figure 14B:
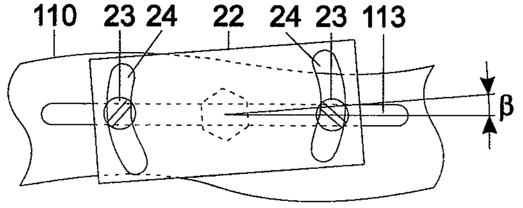

The locking devices 20 according to FIGS. 14A and 14B are applicable to all above described adjusting screws 205.

The adjusting screws 205 are not limited to the illustrated hexagonal screws.

The recess of the cage seat 22 may have any complementary shape to the respectively used adjusting screw 205. If, for example, countersunk screws are employed, the heads of which, once screwed in, are flush with the surface, instead of a recess, the cage seat 22 has a projection in a complementary shape to the head of the countersunk screw. If it is for example a cross-slot countersunk screw, the projection has the form similar to the head of a cross-slot screwdriver.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMERALS

10 swing leaf operator
11 drive motor
12 gear
13 guiding roller
14 guide
20 locking device
21 guiding member
22 cage seat
23 attachment screw
24 oblong hole
100 closer portion
101 pressure roller
102 closer spring
103 cam disc
104 output shaft
105 guide
106 link-plate unit
107 lever
108 closer spring housing
109 closer housing
110 lateral wall
111 connecting rod
112 bearing journal
113 oblong hole
114 link-plate
115 lateral wall
200 adjusting device
201 guide
202 projection
203 groove
204 locking screw
205 adjusting screw
206 locking abutment
207 mounting bracket
208 abutment member
209 abutment member
210 abutment spring
211 mounting bracket
212 screw
$i_{cam}$ power transmission of the cam disc
M torque
$\alpha$ angle β angle
ϕ opening angle of the swing leaf
e eccentricity
$R_B$ direction of movement of the pressure roller
x coordinate direction
y coordinate direction
z coordinate direction

What is claimed is:

1. A swing leaf operator comprising:

a closer portion having an output shaft, a cam disc torsion-resistantly disposed on the output shaft, a pressure roller, a closer spring pressing the pressure roller against a running surface of the cam disc by means of an operational connection, a drive motor in operational connection with the output shaft, wherein the pressure roller is disposed with regard to an axial center of the output shaft such that, upon opening or closing of a swing leaf coupled to the output shaft, the pressure roller is moved along a path, wherein, in different modes of operation of the swing leaf operator at a respective opening angle of the swing leaf, a substantial identical torque is applied to the swing leaf because the path bypasses the axial center of the output shaft and because of a configuration of the running surface of the cam disc, and a means for adjusting a distance of the pressure roller with regard to the path of the pressure roller in a mounted condition of the swing leaf operator, wherein the adjusting means comprises a mounting bracket, at which the pressure roller is stationarily and freely rotatably disposed, the mounting bracket having a threaded bore hole extending in a second direction perpendicular to a longitudinal extension of the output shaft and to a longitudinal extension of the closer portion, the closer portion has a lateral wall, in which a through opening is formed in such a way that, from an outer side of the lateral wall, a screw is insertable into the threaded bore; and the mounting bracket is supported and guided by a guide of a connecting member coupled to the closer spring.

2. The swing leaf operator according to claim 1, wherein the modes of operation comprise an operation of the swing leaf operator with a slide channel and an operation of the swing leaf operator with one of an arm assembly including two lever arms hinged together at a first end and a scissor arm assembly.

3. The swing leaf operator according to claim 2, wherein, the operation is one of a slide channel operation in which the swing leaf operator is mounted on a pull-side and a standard arm assembly operation in which the swing leaf operator is mounted on a push-side.

4. The swing leaf operator according to claim 2, wherein, the operation is one of a slide channel operation in which the swing leaf operator is mounted on a push-side and a standard arm assembly operation in which the swing leaf operator is mounted on a pull-side.

5. The swing leaf operator according claim 2, wherein the modes of operation further comprise operation of the swing leaf operator with a parallel arm assembly.

6. The swing leaf operator according to claim 1, wherein the swing leaf operator is mounted at a transom at an upper portion of a door casing or of a frame, at which the swing leaf is suspended.

7. The swing leaf operator according to claim 1, wherein the operational connection comprises at least one rigid part.

8. The swing leaf operator according to claim 1, wherein the operational connection is a lever mechanism.

9. The swing leaf operator according to claim 1, wherein the cam disc has a symmetrical cross-sectional surface, when seen in a first direction, parallel to a longitudinal extension of the output shaft.

10. The swing leaf operator according to claim 9, wherein the cam disc has a diameter that varies along its running surface.

11. The swing leaf operator according to claim 9, wherein the point of rotation of the cam disc is disposed adjacent a symmetry line of the symmetrical cross-sectional surface.

12. The swing leaf operator according to claim 1, wherein the path of the pressure roller is designed such that, on a first portion of the running surface of the cam disc, the swing leaf operator is configured for a slide channel operation, and on a second portion of the running surface of the cam disc, the swing leaf operator is configured for a standard arm assembly operation;

the first and second portions of the running surface of the cam disc begin at a position on the running surface of the cam disc where the pressure roller is located when the swing leaf is closed; and the second portion of the running surface is different from the first portion of the running surface.

13. The swing leaf operator according to claim 1, further comprising a housing of the swing leaf operator, the housing having a through opening in a respective lateral wall, at least in areas where ends of the output shaft are disposed, the ends of the output shaft being configured to be coupled to a swing leaf.

14. The swing leaf operator according claim 1, wherein the operational connection is a lever mechanism, and a point of rotation of a lever of the lever mechanism is displaceably supported.

15. The swing leaf operator according to claim 14, wherein the adjusting means comprises a mounting bracket at which the pressure roller is stationarily and freely rotatably disposed, the mounting bracket having a threaded bore extending in a third direction parallel to a longitudinal extension of the closer portion, and the swing leaf operator has a lateral wall formed with a through opening in such a way that a screw is insertable into the threaded bore from an outer side of the lateral wall.

16. The swing leaf operator according to claim 1, further comprising a means for releasing the pressure roller from the cam disc in the mounted condition of the swing leaf operator.

17. The swing leaf operator according to claim 1, further comprising an assembly formed of at least the closer spring, the pressure roller, and the operational connection between the closure spring and the pressure roller, wherein the assembly is rotatably disposed in a first plane perpendicularly to the longitudinal extension of the output shaft, a point of rotation of the assembly having a distance to the axial center of the cam disc in the first plane or being displaceable in the first plane at an angle (α) with regard to a connecting line between the pressure roller and an axial center of the cam disc and being respectively disposed to be lockable.

18. The swing leaf operator according to claim 1, wherein the pressure roller is disposed so that, during a rotation of the cam disc, the pressure roller is moved into a position by the cam disc, in which the path of the pressure roller bypasses the axial center of the output shaft.

19. The swing leaf operator according to claim 1, wherein the cam disc is pre-rotated in a position, in which the swing leaf is closed.

20. The swing leaf operator according to claim 1, wherein the adjusting means comprises at least one device for torsion-resistantly locking at least one screw.

21. The swing leaf operator according to claim 20, wherein the locking device has a cage seat which, upon positioning on top of a screw, reaches a rotational engagement with a head of the screw and is disposed to be lockable.

22. A swing leaf operator comprising:

a closer portion having an output shaft, a cam disc torsion-resistantly disposed on the output shaft, a pressure roller, a closer spring pressing the pressure roller against a running surface of the cam disc by means of an operational connection, and a drive motor in operational connection with the output shaft, wherein the pressure roller is disposed with regard to an axial center of the output shaft such that, upon opening or closing of a swing leaf coupled to the output shaft, the pressure roller is moved along a path, wherein, in different modes of operation of the swing leaf operator at a respective opening angle of the swing leaf, a substantial identical torque is applied to the swing leaf because the path bypasses the axial center of the output shaft and because of a configuration of the running surface of the cam disc, and wherein the drive motor and the closer spring are disposed in a plane perpendicular to a longitudinal extension of the swing leaf operator at one side of the output shaft, the drive motor being disposed between the output shaft and the closer spring, the closer spring being stationarily mounted at a first end oriented towards the drive motor and being coupled to at least one connecting rod at a second end facing away from the drive motor;

the at least one connecting rod has an opposite end coupled to a link-plate; and the pressure roller is freely rotatably disposed at the opposite end of the at least one connecting rod.

23. The swing leaf operator according to claim 22, wherein the drive motor is in the operational connection with the output shaft by a gear, the link-plate being configured to surround or enclose the output shaft in a plane perpendicularly to the longitudinal extension of the output shaft and to be guided and supported by the output shaft.

24. The swing leaf operator according to claim 23, wherein the drive motor and the closer spring are disposed adjacent each other in a plane in a direction substantially along a longitudinal extension of the swing leaf operator.

25. The swing leaf operator according to claim 23, wherein the drive motor is disposed at one side of the output shaft, opposite to a side of the output shaft where the closer spring is disposed.

* * * * *